US009499928B2

(12) United States Patent
Kim et al.

(10) Patent No.: US 9,499,928 B2
(45) Date of Patent: *Nov. 22, 2016

(54) POLYESTER FIBER SUITABLE FOR AIR BAG AND METHOD FOR PRODUCING THE POLYESTER FIBER (75) Inventors: Jae-Hyung Kim, Gyeongbuk (KR); Dong-Jin Kwak, Gyeongbuk (KR); Ki-Jeong Kim, Daegu (KR); Hee-Jun Kim, Daegu (KR); Jung-Hoon Youn, Gyeongbuk (KR); Sang-Mok Lee, Gyeonsangbuk-do (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/638,257

(22) PCT Filed: Mar. 25, 2011

(86) PCT No.: PCT/KR2011/002087
§ 371 (c)(1),
(2), (4) Date: Oct. 31, 2012

(87) PCT Pub. No.: WO2011/122802
PCT Pub. Date: Oct. 6, 2011

(65) Prior Publication Data
US 2013/0040522 A1 Feb. 14, 2013

(30) Foreign Application Priority Data
Mar. 29, 2010 (KR) .................. 10-2010-0028046
Mar. 30, 2010 (KR) .................. 10-2010-0028699

(51) Int. Cl.
D03D 1/02 (2006.01)
D04H 1/435 (2012.01)
D01F 6/62 (2006.01)
D04H 3/011 (2012.01)
D02J 1/22 (2006.01)
D01D 5/16 (2006.01)
D03D 15/00 (2006.01)
B60R 21/235 (2006.01)

(52) U.S. Cl.
CPC .............. D04H 1/435 (2013.01); D01D 5/16 (2013.01); D01F 6/62 (2013.01); D02J 1/228 (2013.01); D03D 1/02 (2013.01); D03D 15/00 (2013.01); D04H 3/011 (2013.01); B60R 2021/23514 (2013.01); B60R 2021/23542 (2013.01); Y10T 428/298 (2015.01); Y10T 442/30 (2015.04)

(58) Field of Classification Search
CPC .......... B60R 2021/23514; B60R 2021/23542; D01D 5/16; D01F 6/62; D02J 1/228; D03D 15/00; D03D 1/02; Y10T 428/298; Y10T 442/30; D04H 1/435; D04H 3/011

USPC ........ 428/357, 364, 375, 394, 395, 480, 482
See application file for complete search history.

(56) References Cited

U.S. PATENT DOCUMENTS

| 5,474,836 | A | * | 12/1995 | Nishimura | B60R 21/235 280/728.1 |
|---|---|---|---|---|---|
| 5,540,965 | A | | 7/1996 | Nishimura et al. | |
| 5,637,385 | A | * | 6/1997 | Mizuki | B60R 21/235 280/728.1 |
| 2001/0001689 | A1 | | 5/2001 | Tang et al. | |
| 2002/0041962 | A1 | * | 4/2002 | Kim et al. | 428/375 |
| 2005/0064187 | A1 | * | 3/2005 | Nelson et al. | 428/364 |
| 2005/0153609 | A1 | | 7/2005 | Keshavaraj | |
| 2007/0243378 | A1 | * | 10/2007 | Cho et al. | 428/375 |
| 2010/0181744 | A1 | * | 7/2010 | Crouch | 280/728.1 |
| 2012/0043742 | A1 | * | 2/2012 | Kim et al. | 280/730.2 |
| 2013/0090032 | A1 | * | 4/2013 | Kim et al. | 442/301 |
| 2013/0187367 | A1 | * | 7/2013 | Kim et al. | 280/743.1 |
| 2013/0224468 | A1 | * | 8/2013 | Kim et al. | 428/221 |

FOREIGN PATENT DOCUMENTS

| EP | 1 845 177 A2 | 10/2007 |
|---|---|---|
| JP | 4504284 A | 7/1992 |
| JP | 4214437 A | 8/1992 |
| JP | 06-313265 A | 11/1994 |
| JP | 06306731 A | 11/1994 |
| JP | 748717 A | 2/1995 |
| JP | 07119030 A | 5/1995 |
| JP | 7252740 A | 10/1995 |
| JP | 08-035116 A | 2/1996 |
| JP | 09-143816 A | 6/1997 |
| JP | 2864582 B2 | 12/1998 |
| JP | 2944220 B2 | 8/1999 |

(Continued)

OTHER PUBLICATIONS

International Searching Authority, International Search Report of PCT/KR2011/002087 dated Jan. 2, 2012.
European Patent Office, European Search Report issued in corresponding European Patent Application No. 11762974.1, dated Jul. 9, 2013.
Huang et al., "High Performance Poly(ehtylene terephthalate) Fibre Properties Achieved Via High Speed Spinning with a Modified Liquid Isothermal Bath Process," Polymer, 1997, vol. 38, No. 5, pp. 1101-1110.

(Continued)

Primary Examiner — Arti Singh-Pandey
(74) Attorney, Agent, or Firm — Sughrue Mion, PLLC (57) ABSTRACT A polyester fiber suitable for an airbag fabric has an elongation of 0.8 to 2.0% under a tensile strength of 1.0 g/d at the room temperature, and an additional elongation of 1.5 to 5% under a tensile strength of 8.8 g/d to the maximum. The polyester fiber secures low initial Young's modulus and good mechanical properties and can be used in an airbag fabric not only to provide excellences in air sealing effect as well as packing property and dimensional stability but also to minimize collision impacts on occupants, thereby protecting the occupants with safety.

9 Claims, 2 Drawing Sheets (56) References Cited

FOREIGN PATENT DOCUMENTS

| JP | 2002013024 A | 1/2002 |
| JP | 2012524845 A | 10/2012 |
| KR | 0173494 B1 | 10/1998 |
| KR | 10-2005-0020885 A | 3/2005 |
| WO | 9000638 A1 | 1/1990 | | |
| WO | WO 2009/061161 A1 * | 5/2009 | ............... | D01F 6/62 |
| WO | 2010027228 A2 | 3/2010 | | |
| WO | 2010/123298 A2 | 10/2010 | | |

OTHER PUBLICATIONS

* cited by examiner

POLYESTER FIBER SUITABLE FOR AIR BAG AND METHOD FOR PRODUCING THE POLYESTER FIBER

CROSS REFERENCE TO RELATED APPLICATIONS

This application is a National Stage of International Application No. PCT/KR2011/002087 filed Mar. 25, 2011, claiming priority based on Korean Patent Application Nos. 10-2010-0028046 filed Mar. 29, 2010 and KR 10-2010-0028699 filed Mar. 30, 2010, the contents of all of which are incorporated herein by reference in their entirety.

FIELD OF THE INVENTION

The present invention relates to a polyester fiber applicable to an airbag fabric, and more particularly to a low-modulus polyester fiber with high strength and high elongation, a preparation method for the same, and an airbag fabric comprising the same, where the low-modulus polyester fiber with high strength and high elongation has good mechanical properties, high flexibility, and high dimensional stability.

BACKGROUND OF THE INVENTION

Generally, an airbag refers to a vehicle safety device for providing protection to the occupants during a frontal vehicle collision at an impact speed of about 40 km/h or above by deploying explosive chemicals to generate a gas and inflate the airbag cushion upon sensing a crash with a crash impact sensor.

The requirements for airbag fabrics are low air permeability to facilitate airbag unfolding, high strength and high thermal resistance to protect the airbag from damage or rupture, and high flexibility to reduce impacts on occupants.

Particularly, an airbag for automobile, manufactured in a defined dimension, can be folded into the steering wheel, the door panel, and so forth in the vehicle to reduce its volume to the minimum and then inflated to unfold when the inflator is in operation.

It is therefore of a great importance that the airbag fabric secures good mechanical properties, good folding property, and high flexibility to reduce impacts on the occupants, with a view to effectively maintaining folding and packing properties of the airbag while packing the airbag into the vehicle, preventing damage or rupture of the airbag, achieving high performance of unfolding airbag cushions and minimizing impacts on occupants. In fact, there have never been suggested airbag fabrics capable of maintaining excellences in air sealing effect and flexibility for the occupant's safety, sufficiently enduring impacts on the airbag, and being packed into a vehicle effectively.

Conventionally, polyamide fibers such as nylon 66 have been used as a material for airbag fabric. Despite high impact resistance, nylon 66 is inferior to polyester fibers in regard to resistance to heat and humidity, light resistance, and dimensional stability, and more expensive.

Japanese Patent Publication No. Hei 04-214437 discloses the use of polyester fibers overcoming these problems. However, the use of the conventional polyester fiber in the manufacture of an airbag leads to difficulty in packing the airbag into a small space in a vehicle due to extremely high stiffness, excessive thermal shrinkage during heat treatment at high temperature due to high elasticity and low elongation, and limitations in maintaining good mechanical properties and unfolding performance under severe conditions of high temperature and high humidity.

Accordingly, there is a need for developing a fiber capable of maintaining good mechanical properties and air sealing effect to be suitable for use in airbags for vehicle and providing high flexibility to reduce impacts on occupants, good packing property, and an ability to maintain good mechanical properties under severe conditions of high temperature and high pressure.

SUMMARY OF THE INVENTION

It is an object of the present invention to provide a polyester fiber that secures excellences in mechanical properties, flexibility, and dimensional stability to be suitable for use in airbag fabrics and maintains high performance under severe conditions of high temperature and high humidity.

It is another object of the present invention to provide a method for preparing the polyester fiber.

It is still another object of the present invention to provide an airbag fabric prepared using the polyester fiber.

The present invention provides a polyester fiber having an elongation of 0.8 to 2.0% under a tensile strength of 1.0 g/d at the room temperature, and an additional elongation of 1.5 to 5% under a tensile strength of 8.8 g/d to the maximum.

The present invention also provides a method for preparing the polyester fiber that comprises: melt-spinning a polyester polymer having an intrinsic viscosity of 1.05 to 2.0 dl/g at 270 to 305° C. (degree celsius) to prepare an undrawn polyester fiber; and drawing the undrawn polyester fiber.

The present invention also provides an airbag fabric prepared by using the polyester fiber.

Hereinafter, a detailed description will be given as to a polyester fiber, a preparation method for the same, and an airbag fabric prepared from the same in accordance with specified embodiments of the present invention, which are given by way of illustration only and not intended to limit the scope of the present invention. It will be apparent to those skilled in the art that various changes and modifications are available to the embodiments within the scope of the present invention.

Unless stated otherwise, the terms "comprises", "comprising", "includes" and/or "including" as used herein specify the presence of stated elements (or components) without any specific limitations but do not preclude the addition of other elements (or components).

A polyester fabric for airbag can be prepared by melt-spinning a polyethylene terephthalate (hereinafter, referred to as "PET") polymer into an undrawn fiber, drawing the undrawn fiber, and then weaving the drawn polyester fiber into a polyester fabric. Hence, the characteristics of the polyester fiber may affect the properties of the polyester fabric for airbag directly or indirectly.

To use the polyester fiber as a fiber for airbag instead of the polyamide fiber such as nylon 66 that has been used in the prior art, it is required to overcome the problems in association with the use of the polyester fiber, including deterioration of the folding property resulting from high modulus and high stiffness of the polyester fiber, deterioration of properties under severe conditions of high temperature and high humidity, caused by low melting heat capacity, and the consequent deterioration of the unfolding performance.

Relative to the conventional nylon fiber, the polyester fiber has such a low shrinkage to cause deterioration in the packaging performance of the airbag fabric during heat treatment in the manufacture of the fabric, and a stiff molecular chain to considerably deteriorate the packing property of the polyester fabric for airbag when the airbag is packed into a vehicle. Further, the carboxyl end group (hereinafter, referred to as "CEG") in the polyester molecular chain attacks the ester bond under conditions of high temperature and high humidity to break the molecular chain apart, deteriorating the properties with the progress of aging.

Accordingly, the present invention can be effectively used for an airbag fabric by optimizing the range of the properties, such as strength, elongation, initial Young's modulus, etc., to remarkably reduce stiffness and maintain excellences in mechanical properties, such as toughness and tear strength, and air sealing performance.

Particularly, the inventors of the present invention have found it out from the results of a series of experiments that the use of a polyester fiber having defined characteristics in preparing an airbag fabric can enhance the folding property, dimensional stability, and air sealing effect of the airbag fabric, so that the airbag fabric can maintain good packing property when packed into a vehicle, good mechanical properties, high performance of air leak protection, and high packaging performance even under severe conditions of high temperature and high humidity.

In accordance with one embodiment of the present invention, there is provided a polyester fiber having a defined characteristic. The polyester fiber has an elongation of 0.8 to 2.0% under a tensile strength of 1.0 g/d at the room temperature, and an additional elongation of 1.5 to 5% under a tensile strength of 8.8 g/d to the maximum.

Preferably, the polyester fiber comprises polyethylene terephthalate (PET) as a principal component. Here, a variety of additives may add to the PET in the step of preparing the PET. To provide properties suitable for an airbag fabric, the polyester fiber may comprise at least 70 mol %, more preferably at least 90 mol % of PET. Without any further specific explanation, the term "PET" as used herein is considered to mean at least 70 mol % of PET polymer.

The polyester fiber in accordance with one embodiment of the present invention is prepared under conditions of melt spinning and drawing as defined below, to have elongation of 0.8 to 2.0% under a tensile strength of 1.0 g/d at the room temperature, and an additional elongation of 1.5 to 5% under a tensile strength of 8.8 g/d to the maximum.

Generally, the polyester fiber has such a molecular structure that imparts higher stiffness than nylon fibers or the like, consequently with higher Young's modulus, so the use of a polyester fiber for an airbag fabric leads to considerable deterioration of folding and packing properties to make the airbag fabric difficult to pack into a small space of a vehicle. In contrast, the polyester fiber prepared by melt spinning and drawing under controlled conditions can possess high strength and low Young's modulus, and lower initial Young's modulus than the known polyester fiber for industrial use.

Particularly, the polyester fiber of the present invention features a minimized elongation as well as low initial Young's modulus. In other words, the polyester fiber comprises a plurality of polyester filaments, which have an elongation of 0.8 to 2.0%, preferably 0.85 to 1.2%, under a tensile strength of 1.0 g/de at the room temperature; and an additional elongation of 1.5 to 5%, preferably about 1.7 to 4.7%, under a tensile strength of 8.8 g/d to the maximum at the room temperature. The polyester fiber further has an elongation of 6.5 to 13.5%, preferably 7.5 to 12%, when the polyester filaments are under a tensile strength of 5.0 g/de at the room temperature. Due to low initial Young's modulus and low elongation of the polyester fiber, the airbag fabric prepared from the polyester fiber overcomes the problems with the conventional PET fabric in association with high stiffness and exhibits good folding and packing properties and high flexibility.

For absorption of impact energy instantaneously occurring upon the airbag deploying, the strength-elongation curve of the fiber can be controlled in an optimum range to enhance both the mechanical properties and folding property of the final fabric. Low initial Young's modulus with high strength and high elongation is necessary for the fabric to safely absorb the instantaneous impact energy of the gas ejected upon ignition of explosive chemicals in the airbag at the early stage and acquire good packaging performance and folding properties for achieving an effective unfolding performance. In this regard, the fiber of the present invention is required to have the strength-elongation curve satisfying the above-defined range of elongation with respect to the strength conditions.

Further, the polyester fiber of the present invention may have a maximum strength of 9.0 g/d or greater, or 9.0 to 10.0 g/d, preferably 9.2 g/d or greater, or 9.2 to 9.8 g/d; and a maximum elongation of 14% or greater, or 14 to 23%, preferably 15% or greater, or 15 to 22%, at the breaking point of the strength-elongation curve where the fiber is broken by the tensile force.

Particularly, for absorption of impact energy instantaneously occurring upon the airbag deploying, the mechanical properties and the folding property of the final fabric can be enhanced by controlling both the breaking elongation and the dry shrinkage of the polyester fiber in an optimum range. Low dry shrinkage with high strength and high elongation is necessary in order to acquire good folding property in addition to good toughness and tear strength during airbag unfolding. In this regard, the polyester fiber of the present invention may have a breaking elongation $S^1$ of 14% or greater, or 14 to 23%, preferably 15% or greater, or 15 to 22%; and a dry shrinkage $S^2$ of 1.2% or greater, or 1.2 to 6.5%, preferably 1.5% or greater, or 1.5 to 5.7%. Further, the sum of the breaking elongation $S^1$ and the dry shrinkage $S^2$ is defined by the following calculation formula 1:

$$18 \leq S^1 + S^2 \leq 25 \qquad \text{[Calculation Formula 1]}$$

In the calculation formula, $S^1$ is the breaking elongation (%) of the polyester fiber; and $S^2$ is the dry shrinkage (%) of the polyester fiber.

The sum of the breaking elongation $S^1$ and the dry shrinkage $S^2$ of the fiber can be 18 to 25%, preferably 20 to 24%. Due to this low-elongation characteristic of the polyester fiber, the airbag fabric prepared from the polyester fiber overcomes the problem with the conventional PET fabric in association with high stiffness and exhibits good folding and packing properties and high flexibility.

Particularly, the polyester fiber can secure high toughness and low initial Young's modulus by maintaining the breaking elongation of the fiber as denoted by $S^1$ in the calculation formula 1, that is, the value of elongation rate to be 14% or above. Thus, the airbag fabric using the polyester fiber can not only sufficiently absorb the high temperature high pressure gas energy but also secure good folding property to impart good packing property for the airbag packed into a vehicle and good unfolding property during airbag unfolding. In addition to the breaking elongation of the fiber, the dry shrinkage of the fiber as denoted by $S^2$ in the calculation formula 1 can be maintained to be 1.2% or above, to prevent the fiber from being broken by vibration due to high relaxation or high temperature of the godet rollers in the actual fiber-making process and enhance the fiber-making workability. At the same time, the sum of the breaking elongation and the dry shrinkage of the fiber as represented by the calculation formula 1 is preferably 18% or greater in consideration of the toughness and packing property of the airbag fabric using the polyester fiber; and 25% or less considering the spinnability and workability of the fiber for airbag.

Further, both the mechanical properties and folding properties of the final fabric can be enhanced by controlling the strength-elongation curve of the polyester fiber of the present invention in an optimum range. Particularly, the polyester fiber can have a characteristic of high strength and low Young's modulus, which is lower than in the conventional polyester fiber for industrial use. More specifically, the Young's modulus $M^1$ of the polyester fiber at 1% elongation as measured according to the ASTM D 885 method is 60 to 100 g/de, preferably 75 to 95 g/de; and the Young's modulus $M^2$ of the polyester fiber at 2% elongation is 20 to 60 g/de, preferably 22 to 55 g/de. The polyester fiber of the present invention has a considerably lower Young's modulus than the conventional polyester fiber for industrial use, which has a Young's modulus of at least 110 g/de at 1% elongation and at least 80 g/de at 2% elongation.

As for the initial Young's modulus of the polyester fiber, the ratio ($M^1/M^2$) of the Young's modulus $M^1$ at 1% elongation to the Young's modulus $M^2$ at 2% elongation is defined by the following calculation formula 2:

$$1.7 \leq M^1/M^2 \leq 3.5 \qquad \text{[Calculation Formula 2]}$$

In the calculation formula, $M^1$ is the Young's modulus (g/de) of the polyester fiber at 1% elongation; and $M^2$ is the Young's modulus (g/de) of the polyester fiber at 2% elongation.

As can be seen from the calculation formula 2, the ratio ($M^1/M^2$) of the Young's modulus $M^1$ at 1% elongation to the Young's modulus $M^2$ at 2% elongation is 1.7 to 3.5, preferably 1.9 to 3.3. The polyester fiber is required to have such a low initial Young's modulus within the defined range of Young's modulus with respect to the specific elongation conditions so that the airbag fabric using the polyester fiber can acquire good packaging performance and folding properties in order to safely absorb the instantaneous impact energy of the gas ejected upon ignition of explosive chemicals in the airbag at the early stage and deploy to unfold effectively.

The Young's modulus of the polyester fiber is the modulus of elasticity defined as the slope in the elastic portion of the stress-strain curve obtained in the tensile testing and corresponds to the elastic modulus describing how much an object is elongated and deformed as the object is stretched at both ends. The fiber with high Young's modulus has good elasticity, but results in deteriorated stiffness of the fabric; while the fiber with extremely low Young's modulus has good stiffness, but with low elastic recovery, deteriorating the mechanical properties (e.g., toughness, etc.) of the fabric. In this regard, the airbag fabric prepared from the polyester fiber having a relatively low initial Young's modulus within an optimized range overcomes the problems with the conventional polyester fabric in association with high stiffness and secures excellences in folding and packing properties and flexibility.

Particularly, the Young's modulus of the fiber at 1% elongation as denoted by $M^1$ in the calculation formula 2 is preferably 60 g/de or greater in consideration of the crystal structure and orientation required to achieve good properties as an airbag fiber, and 100 g/de or less considering the folding property of an airbag cushion. The Young's modulus of the fiber at 2% elongation as denoted by $M^2$ in the calculation formula 2 is preferably 20 g/de or greater in consideration of the rapid unfolding performance of the airbag cushion during airbag unfolding, and 60 g/de or less considering the folding property of the airbag cushion. Further, the ratio ($M^1/M^2$) of the Young's modulus $M^1$ at 1% elongation to the Young's modulus $M^2$ at 2% elongation is preferably 1.7 or above with a view to acquiring good properties of the airbag fabric and the unfolding performance of the airbag cushion, and 3.5 or below in consideration of the folding property of the airbag fabric.

The polyester fiber also has an enhanced intrinsic viscosity relative to the conventional fiber, that is, 0.8 dl/g or greater, or 0.8 to 1.2 dl/g, preferably 0.85 dl/g or greater, 0.85 to 1.15 dl/g, more preferably 0.9 dl/g or greater, or 0.9 to 1.1 dl/g. The intrinsic viscosity is preferably maintained within the above-defined range in order to prevent thermal deformation of the polyester fiber used for airbag during the coating process.

The intrinsic viscosity of the fiber 0.8 dl/g or greater is preferable to acquire high strength with low elongation and thus meet the requirements of the airbag fiber, while the intrinsic viscosity below 0.8 dl/g leads to high elongation of the fiber. Such a high elongation results in an increased degree of orientation and hence a high Young's modulus, so the fabric cannot acquire good folding property. It is thus preferable to achieve low elongation and hence low Young's modulus by maintaining the intrinsic viscosity of the fiber 0.8 d/g or greater. The intrinsic viscosity greater than 1.2 dl/g increases the drawing tension in the drawing process to cause problems in the process. The intrinsic viscosity of 1.2 dl/g or less is more preferable. By maintaining such a high level of intrinsic viscosity, the polyester fiber of the present invention can provide low stiffness with low elongation and also high strength, which imparts mechanical properties, impact resistance, and toughness good enough for the airbag fabric.

It is therefore possible to prepare an airbag fabric excellent in mechanical properties, packing property, dimensional stability, impact resistance, and air sealing effect, by using the polyester fiber having such a low initial Young's modulus and a high elongation, preferably high intrinsic viscosity. Thus, the use of the polyester fiber results in production of an airbag fabric which exhibits excellences in impact resistance, dimensional stability, mechanical properties, and packaging performance, as well as low stiffness, good folding and packing properties, and good flexibility. The resultant polyester fabric for airbag has excellences in mechanical properties, dimensional stability, and air sealing effect, provides good folding and packing properties when packed into a small space of a vehicle, and minimizes the collision impacts on occupants with good flexibility to protect the occupants safely, so it can be preferably used as an airbag fabric or the like.

The polyester fiber according to one embodiment of the present invention is prepared under the conditions of melt spinning and drawing as defined below, to have a considerably low CEG (carboxyl end group) content relative to the conventional polyester fiber, that is, 50 meq/kg or less, preferably 40 meq/kg or less, more preferably 30 meq/kg or less. The CEG in the polyester molecular chain attacks the ester bond under conditions of high temperature and high humidity to break the molecular chain apart, deteriorating the properties with the progress of aging. In case of using the polyester fiber in an airbag, the CEG content greater than 50 meq/kg leads to deterioration of properties as the CEG breaks the ester bond under conditions of high temperature and high humidity. Thus, the CEG content is preferably 50 meq/kg or less.

On the other hand, the polyester fiber according to one embodiment of the present invention has a toughness of 70 to 95 J/m³, where the toughness is defined by the following calculation formula 3. As stated above, the polyester fiber of the present invention can secure excellent performances required to airbag fabrics as well as good levels of strength and properties, by maintaining intrinsic viscosity, initial Young's modulus, and elongation within an optimum range.

$$\text{Toughness(work of rupture)} = \int_0^{strain} F \cdot dl \quad \text{[Calculation Formula 3]}$$

In the calculation formula, F denotes the load applied when the length of the polyester fiber or fabric is increased by dl; and dl is the increment of the length of the polyester fiber or fabric.

Compared with the conventional fiber, the polyester fiber has a higher level of toughness (work of rupture) and thus more effectively absorbs the energy of high temperature high pressure gas. More specifically, the polyester fiber has a toughness of 70 to 95 J/m³, preferably 75 to 90 J/m³, so it is capable of effectively absorbing the energy of high temperature and high pressure gas and being used as a fiber for airbag more effectively.

Figure 2:
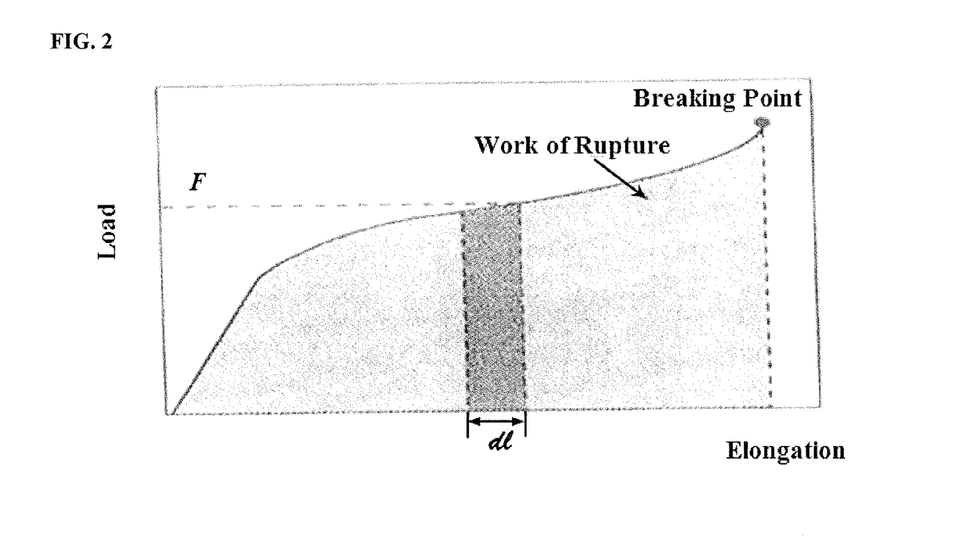
FIG. 2 is an example of the strength-elongation curve of a normal fiber, where the area underneath the strength-elongation curve is defined as toughness (work of rupture, $J/m^3$).

The term "toughness" as used herein is defined as the amount of energy that the fiber (hereinafter, including the fabric as well) can absorb before breaking under the tensile force, as represented by the calculation formula 3, and also defined as the resistance to an instantaneous impact on the fiber. When the length of a fiber is increased from 1 to 1+dl under load F, the work is F·dl, and the toughness required to break the fiber is as given by the calculation formula 3. In other words, the toughness is given by the area underneath the strength-elongation curve of the fiber and the fabric (See. FIG. 2). The fabric exhibits higher toughness with an increase in the strength and elongation of the fiber used to form the fabric. Particularly, the airbag fabric with low toughness is susceptible to rupture, because the low toughness results in low resistance to the instantaneous unfolding impact from the inflator under high temperature high pressure conditions in the event of airbag unfolding. Accordingly, the fiber of the present invention of which the toughness is, for example, below 70 kJ/m³ is unsuitable for use in an airbag fabric.

As described above, the polyester fiber of the present invention can not only secure a high level of strength and properties but also achieve excellent performances when used in preparation of an airbag fabric, by securing intrinsic viscosity, initial Young's modulus, and elongation within an optimum range.

Preferably, the polyester fiber had a shrinkage stress of 0.005 to 0.075 g/d at 150° C. which corresponds to the laminate coating temperature of general coated fabrics; and 0.005 to 0.075 g/d at 200° C. which corresponds to the sol coating temperature of general coated fabrics. In other words, the shrinkage stress of at least 0.005 g/d at 150° C. or 200° C. prevents the fabric sagging under the heat during the coating process, and the shrinkage stress of 0.075 g/d or less reduces the relaxation stress in the process of cooling down to the room temperature subsequent to the coating process. The shrinkage stress is based on the value measured under a fixed load of 0.10 g/d.

To prevent deformation of the fabric in the treat treatment process, such as the coating process, the polyester fiber has a degree of crystallization in the range of 40 to 55%, preferably 41 to 52%, more preferably 41 to 50%. The degree of crystallization of the fiber is required to be 40% or greater in view of maintaining the thermal dimensional stability when the fiber is applied to an airbag fabric; and preferably 55% or less, for the degree of crystallization greater than 55% leads to a decrease in the amorphous area, and hence a deterioration of the impact absorption performance.

Further, the polymer fiber has a filament fineness of 2.5 to 6.8 DPF (Denier Per Filament), preferably 2.92 to 4.55 DPF. For effective use in an airbag fabric, the fiber preferably has a total fineness of 400 to 650 denier in order to maintain low fineness and high strength in consideration of the folding performance of the airbag cushion and the absorption performance for absorbing high temperature high pressure unfolding energy during airbag unfolding. The fineness of the fiber is preferably 400 denier or greater considering the energy absorption performance; and 650 denier or less in view of securing good folding property for the airbag cushion. The higher filament count results in the softer polyester fiber, but an extremely high filament count leads to low spinnability. Therefore, the preferable filament count is 96 to 160.

The above-described polyester fiber according to one embodiment of the present invention can be prepared by melt-spinning a PET polymer into an undrawn fiber and then drawing the undrawn fiber. The specific conditions or procedures of the individual steps affect the properties of the polyester fiber directly or indirectly and thus contribute to the production of polyester fiber with the above-mentioned properties.

It has been found it out that through the above-described optimization of the processes, a polyester fiber for airbag can be prepared to have an elongation of 0.8 to 2.0% under a tensile strength of 1.0 g/d at the room temperature, and an additional elongation of 1.5 to 5% under a tensile strength of 8.8 g/d to the maximum. It has also been revealed that such an optimization of the melt-spinning and drawing processes can minimize the content of CEG which acts like an acid under conditions of high humidity to break the fundamental molecular chain of the polyester fiber apart. Therefore, the polyester fiber has low initial Young's modulus and high elongation and thus can be preferably adopted in an airbag fabric having excellences in mechanical properties, packing property, dimensional stability, impact resistance, and air sealing effect.

The preparation method for the polyester fiber can be described in further detail in a stepwise manner as follows.

The preparation method for the polyester fiber comprises: melt-spinning a polyester polymer having an intrinsic viscosity of 1.05 to 2.0 dl/g at 270 to 305° C. to prepare an undrawn polyester fiber; and drawing the undrawn polyester fiber.

An outlined description will be given as to the melting spinning and drawing processes of the present invention for those skilled in the art with reference to the accompanying drawing.

Figure 1:
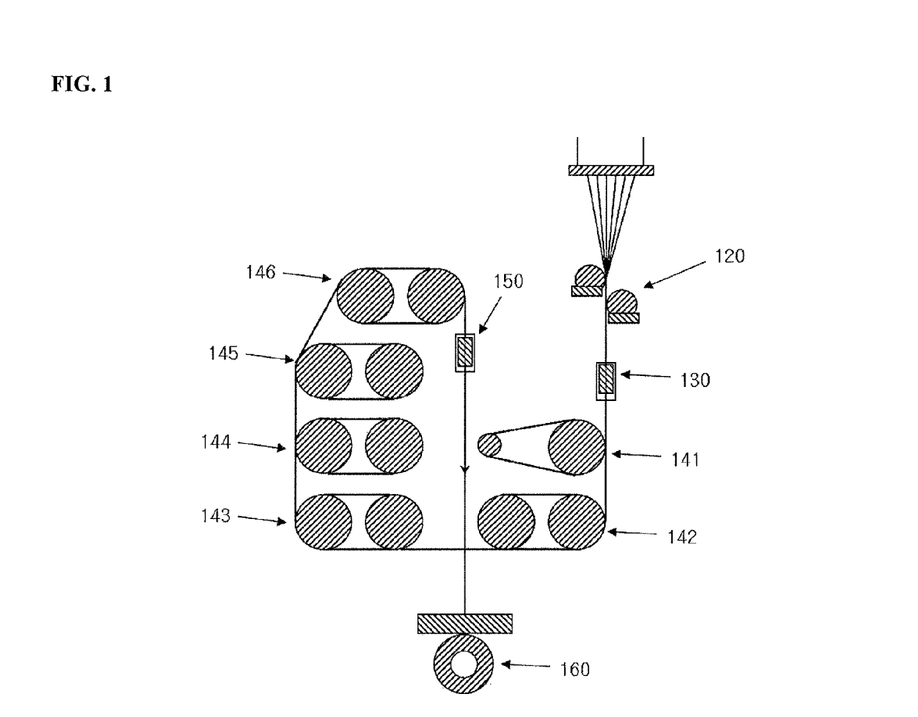
FIG. 1 is a schematic diagram showing the process of preparing a polyester fiber according to one embodiment of the present invention.

FIG. 1 is a schematic diagram showing the preparation process for a polyester fiber comprising melt-spinning and drawing steps in accordance with one embodiment of the present invention. In the preparation method of the polyester fiber according to the present invention, as shown in FIG. 1, the polyester chip prepared by the above-described method is melt, subjected to spinning through a spinneret, and then quenched with quenching air. An oil is applied to the undrawn fiber using an oil roll (or oil jet) 120 and then uniformly dispersed on the surface of the undrawn fiber under a predetermined air pressure. The undrawn fiber is drawn through a multi-step drawing machine 141 to 146, and the drawn fiber is intermingled under a predetermined pressure in a second interlacer 150 and wound in a winding unit 160 to yield a fiber.

First of all, in the preparation method of the present invention, a high-viscosity polyester polymer is subjected to melt spinning to prepare an undrawn polyester fiber. The polyester polymer may comprise polyethylene terephthalate (PET) as a principal component, preferably at least 70 mol %, more preferably at least 90 mol % of PET.

To prepare an undrawn polyester fiber with low initial Young's modulus and high elongation, the melt spinning process is preferably carried out at such a low temperature as to minimize the thermal degradation of the PET polymer. More specifically, the low-temperature spinning is conducted at a spinning temperature, such as of 270 to 305° C., preferably 280 to 300° C., more preferably 282 to 298° C., in order to minimize deterioration of the properties of the high-viscosity PET polymer, such as intrinsic viscosity and CEG content, during the process, that is, to maintain high viscosity and low CEG content of the PET polymer. The spinning temperature as used herein refers to the temperature of an extruder. The melt spinning process at a spinning temperature above 305° C. may cause a thermal degradation of the PET polymer to lower the intrinsic viscosity, enhancing a decrease of the molecular weight and an increase of the CEG content and thus deteriorating the whole properties due to damage on the surface of the fiber. In contrast, the melt spinning process at a spinning temperature below 270° C. may render the PET polymer difficult to melt and thus deteriorate the spinnability of the PET polymer because of the N/Z surface cooled down. Hence, the melt spinning process is preferably carried out at a temperature in the above-defined range.

From the results of a series of experiments, it has been revealed that a high-strength fiber can be obtained without applying a high draw ratio in the subsequent drawing process by melt-spinning the PET polymer at such a low temperature to minimize the degradation reaction of the PET polymer and maintain high intrinsic viscosity and thus high molecular weight, and that a polyester fiber satisfying the above-defined range of properties can be prepared by conducting the drawing process at low draw ratio to effectively lower the Young's modulus.

Further, the melt spinning process may be carried out at a low melt-spinning rate for the PET polymer, for example, in the range of 300 to 1,000 m/min, preferably 350 to 700 m/min, in order to provide low spinning tension, that is, to minimize the spinning tension, in view of minimizing the degradation of the PET polymer. The melt-spinning process of the PET polymer under such conditions of low spinning tension and low spinning rate can further minimize the degradation of the PET polymer.

The undrawn fiber obtained after the melt-spinning process may have an intrinsic viscosity of 0.8 dl/g or greater, or 0.8 to 1.2 dl/g, preferably 0.85 dl/g or greater, or 0.85 to 1.15 dl/g, more preferably 0.9 dl/g or greater, or 0.9 to 1.1 dl/g. The CEG content in molecule of the undrawn fiber may be 50 meq/kg or less, preferably 40 meq/kg or less, more preferably 30 meq/kg or less. The CEG content in molecule of the undrawn fiber can be maintained at the same level in the drawn fiber obtained after the subsequent drawing process, that is, the polyester fiber.

As described above, in order to prepare a polyester fiber having high strength and low Young's modulus, a high-viscosity PET polymer, such as, for example, a PET polymer having an intrinsic viscosity of 1.05 dl/g or greater is preferable in preparing an undrawn fiber, and the high viscosity is maintained at the maximum level of the range throughout the melt spinning and drawing processes, to acquire high strength with low draw ratio and thus effectively lower Young's modulus. The intrinsic viscosity is more preferably 2.0 dl/g or less in view of preventing the molecule chain broken due to the increased melting temperature for the PET polymer and the pressure from being increased by the amount of extrusion from the spinning pack.

On the other hand, the CEG content in molecule of the PET polymer is preferably 30 meq/kg or less so that the polyester fiber can maintain good properties under conditions of high temperature and high humidity when applied to an airbag fabric. The low CEG content of the PET polymer is preferably maintained at the minimum level of the range throughout the melt spinning and drawing processes, so that the final polyester fiber can secure high strength, high dimensional stability, good mechanical properties, and the ability to acquire such good properties even under severe conditions. In this regard, the CEG content of the PET chip greater than 30 meq/kg leads to an excessive increase in the CEG content in molecule of the polymer fiber, for example, exceeding 30 to 50 meq/kg after the melt spinning and drawing processes, thereby breaking the ester bond by the CEG under conditions of high humidity and thus deteriorating the properties of the fiber and the fabric using the fiber.

Particularly, the PET polymer with high viscosity and low CEG content is subjected to the melt spinning process at the above-defined low temperature, which suppresses the thermal degradation of the PET polymer to the maximum extent and thereby minimizes the difference in intrinsic viscosity and CEG content between the PET polymer and the polyester fiber. For example, the melt spinning and drawing processes can be carried out so that the difference in intrinsic viscosity between the PET polymer and the polyester fiber is 0.8 dl/g or less, or 0 to 0.8 dl/g, preferably 0.7 dl/g or less, or 0.1 to 0.7 dl/g. Further, the processes can be carried out so that the difference in CEG content in molecule between the PET polymer and the polyester fiber is 20 meq/kg or less, or 0 to 20 meq/kg, preferably 15 meq/kg or less, or 3 to 15 meq/kg.

The present invention can maintain good mechanical properties of the polyester fiber and secure high elongation by suppressing a decrease of the intrinsic viscosity and an increase of the CEG content of the PET polymer to the maximum extent, and thus prepare a low-modulus fiber with high strength suitable for airbag fabrics.

Preferably, the PET chip is spinned through a spinneret designed to make the fineness of a monofilament in the range of 2.5 to 6.8 DPF. In other words, the fineness of the monofilament may be at least 2.5 DPF in view of reducing a break of the fiber during the spinning process and a risk of breaking the fiber due to interference by another filament during the quenching process, and 6.8 DPF or less in order to enhance the quenching efficiency.

Subsequent to the melt spinning process of the PET polymer, a quenching process is carried out to prepare the undrawn PET fiber. The quenching process is performed preferably by applying a quenching air at 15 to 60° C. while controlling the quenching air flow in the range of 0.4 to 1.5 m/s under the respective temperature conditions of the quenching air. This makes it easier to prepare the undrawn PET fiber having the defined properties according to one embodiment of the present invention.

The undrawn fiber prepared by the spinning process is subjected to the drawing process to prepare a drawn fiber. The drawing process may be carried out at a total draw ratio of 5.0 to 6.5, preferably 5.15 to 6.4. The undrawn polyester fiber has high intrinsic viscosity and low initial Young's modulus with a minimum level of CEG content in molecule by optimization of the melt spinning process. The drawing process carried out at an extremely high draw ratio, for example, greater than 6.5 may result in excessive drawing, causing breaking or irregularity of the drawn fiber, and an extremely high degree of orientation of the fiber, which leads to the preparation of a fiber having low elongation and high Young's modulus. As the fiber has a decrease of the elongation and an increase of the Young's modulus under drawing conditions of such a high draw ratio, an airbag fabric using the fiber may be poor in folding and packing properties. Contrarily, the drawing process at a relatively low draw ratio results in a low degree of orientation of the fiber, so the polyester using the fiber may be partially deteriorated in strength. But, the drawing process carried out at a draw ratio of at least 5.0 in consideration of properties can produce a polyester fiber with high strength and low Young's modulus that is suitable for use in an airbag fabric or the like. Therefore, the drawing process is preferably carried out at a draw ratio of 5.0 to 6.5.

In accordance with another preferred embodiment of the present invention, the preparation method may include drawing, thermo-setting, relaxation, and winding, where a high-viscosity PET chip is subjected to melt spinning and wound on a winder unit through multi-sep godet rollers in order to prepare a low-modulus polyester fiber having high strength and high elongation by the direct spin draw process.

The drawing process can be carried out after the undrawn fiber passes through the godet rollers with an oil pick-up of 0.2 to 2.0%.

In the relaxation process, the relaxation is preferably in the range of 1 to 14%. The relaxation below 1% provides a polyester fiber that does not have shrinkage but a high degree of orientation likewise at a high draw ratio, resulting in failure to prepare a polyester fiber with high elongation and low Young's modulus. The relaxation above 14% causes severe vibration of the fiber on the godet rollers, deteriorating workability.

The drawing process may further include a thermo-setting process for processing the undrawn fiber by heat treatment at approximately 170 to 250° C. For an appropriate progress of the drawing process, the heat treatment can be preferably conducted at 175 to 240° C., more preferably 180 to 245° C. In this regard, the heat treatment temperature below 170 C.° leads to a decrease of the relaxation efficiency due to insufficient thermal effect, consequently with poor shrinkage; while the heat treatment temperature above 250° C. results in a deterioration of strength and an increase of tar generated on the rollers due to thermal degradation, thus deteriorating workability.

The winding speed is 2,000 to 4,000 m/min, preferably 2,500 to 3,700 m/min.

In accordance with still another embodiment of the present invention, there is provided an airbag fabric comprising the polyester fiber.

The term "airbag fabric" as used herein refers to a woven or nonwoven fabric used in the manufacture of airbags for vehicle and is prepared using the polyester fiber obtained by the above-described process.

Rather than using the conventional high-modulus polyester fiber with high strength and low elongation, the present invention uses a low-modulus polyester fiber having high strength and high elongation to provide a polyester fabric for airbag, which is superior in dimensional stability, air sealing performance, folding property, flexibility, and packing property as well as in energy absorption performance during inflation of the airbag. The airbag fabric not only has good properties at the room temperature but also maintains good mechanical properties and high packaging performance throughout the aging under severe conditions of high temperature and high humidity.

More specifically, the airbag fabric of the present invention has a tensile strength of 220 to 350 kgf/inch, preferably 230 to 300 kgf/inch, as measured at the room temperature according to the ASTM D 5034 method. Preferably, the tensile strength is 220 kgf/inch or greater in consideration of the properties that have been required for the airbag; and 350 kgf/inch or less in view of actually achieving the properties.

The airbag fabric of the present invention has a breaking elongation of 20 to 60%, preferably about 30 to 50%, as measured at the room temperature according to the ASTM D 5034 method. Preferably, the breaking elongation is 20% or greater in consideration of the properties that have been required for the airbag; and 60% or less in view of actually achieving the properties.

The polyester fabric has a toughness of 3.5 to 6.0 kJ/m$^3$, where the toughness is defined by the following calculation formula 3.

$$\text{Toughness(work of rupture)} = \int_0^{strain} F \cdot dl \quad \text{[Calculation Formula 3]}$$

In the calculation formula 3, F denotes the load applied when the length of the polyester fiber or fabric is increased by dl; and dl is the increment of the length of the polyester fiber or fabric.

Compared with the conventional polyester fabric, the polyester fabric has a higher level of toughness (work of rupture) and thus more effectively absorbs the energy of high temperature high pressure gas. More specifically, the polyester fabric of which the toughness is 3.5 to 6.0 kJ/m$^3$, preferably 3.8 to 5.7 kJ/m$^3$, absorbs and endures the energy of high temperature high pressure gas and thus can be very effectively used as an airbag fabric. The airbag fabric with low toughness is susceptible to rupture, because the low toughness results in low resistance to the instantaneous unfolding impact from the inflator under high temperature high pressure conditions in the event of airbag unfolding. Accordingly, the fabric of the present invention of which the toughness is, for example, below 3.5 kJ/m$^3$ is unsuitable for use as an airbag fabric.

Further, the airbag fabric is required to have a high level of tear strength when rapidly inflated with high temperature high pressure gas. The tear strength, which indicates the bursting strength of the airbag fabric, is 18 to 30 kgf when measured according to the ASTM 2261 TONGUE method for an uncoated fabric; and 30 to 60 kgf when measured according to the ASTM 2261 TONGUE method for a coated fabric. In this regard, the tear strength of the airbag fabric below the lower limit of the defined range, that is, less than 18 kgf for an uncoated fabric or less than 30 kgf for a coated fabric leads to a rupture of the airbag during unfolding, consequently with a risk of airbag malfunction. On the other hand, the tear strength of the airbag fabric above the upper limit of the defined range, that is, greater than 30 kgf for an uncoated fabric or greater than 60 kgf for a coated fabric leads to lower edge comb resistance of the fabric, abruptly deteriorating air sealing performance during airbag unfolding.

For the airbag fabric of the present invention, the shrinkage in the warp or weft direction as measured according to the ASTM D 1776 method is 1.0% or less, preferably 0.8% or less. Even after the aging process, the shrinkage in the warp or weft direction is 1.0% or less, preferably 0.8% or less. Preferable, the shrinkage in the warp or weft direction does not exceed 1.0% in consideration of the dimensional stability of the fabric.

As described above, the airbag fabric can maintain excellences in toughness and tear strength and considerably reduce the stiffness by using a polyester fiber having high strength and low Young's modulus. For the airbag fabric, the toughness as measured according to the ASTM 4032 method is 1.5 kgf or less, or 0.3 to 1.5 kgf, preferably 1.2 kgf or less, or 0.3 to 1.2 kgf, more preferably 0.8 kgf or less, or 0.3 to 0.8 kgf. Compared with the conventional polyester fabric, the airbag fabric of the present invention has a considerably lower stiffness and thus exhibits excellences in folding property, flexibility, and packing property when mounted into a vehicle.

It is preferable that the fabric of the present invention maintains the above-defined range of stiffness for use as an airbag fabric. An extremely low stiffness provides an insufficient protection/support function while the airbag is inflated to unfold, and deteriorates the ability to maintain the shape when the airbag is folded into a vehicle, resulting in deterioration of the packing property. In view of preventing a deterioration of the packing property due to extremely high stiffness of the airbag fabric that makes it difficult to fold the fabric into a vehicle, the stiffness of the fabric is preferably 1.5 kgf or less, and particularly 0.8 kgf or less when the fineness of fabric is 460 denier or below, and 1.5 kgf or less when the fineness is 550 denier or above.

For the airbag fabric of the present invention, the static air permeability as measured according to the ASTM D 737 method for an uncoated fabric is 10.0 cfm or less, or 0.3 to 10.0 cfm, preferably 8.0 cfm or less, or 0.3 to 8.0 cfm, more preferably 5.0 cfm or less, or 0.3 to 5.0 cfm when ΔP is 125 pa; and 14 cfm or less, or 4 to 14 cfm, preferably 12 cfm or less, or 4 to 12 cfm when ΔP is 500 pa. Further, the dynamic air permeability as measured according to the ASTM D 6476 method is 1,700 mm/s or less, preferably 1,600 mm/s or less, or 200 to 1,600 mm/s, more preferably 1,400 mm/s or less, or 400 to 1,400 mm/s. The term "static air permeability" as used herein refers to the quantity of air penetrating into the airbag fabric under a predetermined pressure. The static air permeability decreases with a decrease in the filament fineness (denier per filament) of the fiber and an increase in the density of the fabric. The term "dynamic air permeability" as used herein refers to the quantity of air penetrating into the airbag fabric under an average instantaneous differential pressure of 30 to 70 kPa. In the same manner of the static air permeability, the dynamic air permeability decreases with a decrease in the filament fineness of the fiber and an increase in the density of the fabric.

By including a rubber coating layer, the airbag fabric can secure a considerably reduced air permeability, approximating to 0 cfm. Due to the rubber coating layer, the static air permeability of the coated airbag fabric according to the present invention (as measured by the ASTM D 737 method) is 0.1 cfm or less, preferably 0 to 0.1 cfm, more preferably 0.05 or less, or 0 to 0.005 cfm, when ΔP is 125 pa; and 0.3 cfm or less, preferably 0 to 0.3 cfm, preferably 0.1 cfm or less, or 0 to 0.1 cfm, when ΔP is 500 pa.

In view of maintaining the packaging performance of the airbag fabric, it may not be desirable that the airbag fabric of the present invention, either uncoated or coated, has the static air permeability or the dynamic air permeability above the upper limit of the corresponding air permeability range as defined above.

In accordance with still further another embodiment of the present invention, there is provided a method for preparing an airbag fabric using a polyester fiber. The method for preparing an airbag fabric of the present invention comprises: weaving the polyester fiber into a grey fabric for airbag; scouring the grey fabric for airbag; and tentering the scoured fabric.

In the present invention, the polyester fiber can be processed into the final airbag fabric by known methods of weaving, scouring, and tentering. The weaving type of the fabric is not specifically limited but preferably includes plain weaving or OPW type weaving.

Particularly, the airbag fabric of the present invention can be prepared from the polyester fiber as warp and weft threads by beaming, weaving, scouring, and tentering. The fabric can be woven with a known weaving machine, which is not specifically limited but includes a rapier loom, an air jet loom, or a water jet loom for plain woven fabrics, and a Jacquard loom for OPW fabrics.

Preferably, the airbag fabric of the present invention further comprises a coating layer composed of at least one of silicone resin, polyvinyl chloride resin, polyethylene resin, or polyurethane resin, where the coating layer is applied on the surface of the airbag fabric by coating or lamination. The type of the coating resin is not specifically limited to the above-listed substances. The resin coating layer can be applied by any known coating method, which includes, but is not specifically limited to, knife over-roll coating, doctor blade coating, or spray coating.

The coating weight per unit area of the rubber coating layer is 20 to 200 g/m$^2$, preferably 20 to 100 g/m$^2$. More specifically, the coating weight is preferably 30 to 95 g/m$^2$ for OPW (One Piece Woven) type side curtains or airbag fabrics, and 20 to 50 g/m$^2$ for plain woven airbag fabrics.

The coated airbag fabric may be processed into an airbag cushion in a defined shape through cutting and sewing processes. The airbag cushion is not specifically limited in shape and may be formed in any normal shape.

In accordance with a still further another embodiment of the present invention, there is provided an airbag system comprising the airbag. The airbag system may be equipped with devices well-known to those skilled in the art. The airbags are classified into frontal airbags and side curtain airbags. The frontal airbags include driver side airbags, passenger side airbags, side protection airbags, knee airbags, ankle airbags, pedestrian airbags, and so forth. The side curtain airbags deploy to protect occupants in the event of the vehicle's side impact collision or rollover. Accordingly, the airbag of the present invention includes both frontal airbags and side curtain airbags.

The present invention does not preclude addition or omission of the elements or components other than those stated herein under necessity, which are not specifically limited.

The present invention provides a polyester fiber and an airbag fabric prepared using the polyester fiber, where the polyester fiber has a considerably reduced stiffness and good mechanical properties, such as high toughness and high tear strength.

The airbag fabric optimized to have high strength, high elongation, and low Young's modulus can be used as an airbag fabric to impart excellences in dimensional stability, mechanical properties, and air sealing effect and also to secure good folding property and high flexibility, thereby remarkably improving packing property when installed into a vehicle and minimizing collision impacts on occupants to protect the occupants with safety.

Accordingly, the polyester fiber of the present invention and the polyester fabric using the polyester fiber are preferably applicable to the manufacture of airbags for vehicle.

DETAILED DESCRIPTION OF THE INVENTION

Hereinafter, the present invention will be described in detail with reference to the preferred examples, which are given only to exemplify the present invention and not intended to limit the scope of the present invention.

Examples 1 to 5

A PET polymer with defined intrinsic viscosity and CEG content was subjected to melt spinning and quenching to prepare an undrawn fiber. The undrawn fiber was drawn at a defined draw ratio and subjected to heat treatment to prepare a polymer fiber. In the regard, Table 1 shows the intrinsic viscosity, CEG content in molecule, melt-spinning rate and spinning tension, spinning temperature, draw ratio, and heat treatment temperature of the PET polymer. The other conditions are as known in the prior art in association with the preparation of a polyester fiber.

TABLE 1

| Div. | Examples | | | | |
|---|---|---|---|---|---|
|  | 1 | 2 | 3 | 4 | 5 |
| PET content (mol %) | 100 | 100 | 100 | 100 | 100 |
| Intrinsic viscosity (dl/g) of PET chip | 1.25 | 1.33 | 1.50 | 1.70 | 1.88 |
| CEG content (meq/kg) of PET chip | 30 | 27 | 24 | 23 | 22 |
| Spinning temperature (° C.) | 293 | 295 | 295 | 295 | 295 |
| Total draw ratio | 5.99 | 6.03 | 6.11 | 6.09 | 6.07 |
| Heat treatment temperature (° C.) | 235 | 239 | 243 | 240 | 244 |
| Relaxation (%) | 5.6 | 5.7 | 5.8 | 6.1 | 6.3 |

The polyester fibers prepared in Examples 1 to 5 were measured in regard to properties according to the following methods. The measurement results are presented in Table 2.

(1) Tensile Strength and Breaking Elongation

The polyester fibers were measured in regard to tensile strength and breaking elongation with a universal testing machine (Instron), where the length of the specimen was 250 mm, the tensile speed was 300 mm/min, and the initial rod strength was 0.05 g/d.

The strength-elongation curve plotting the tensile strength and the breaking elongation was used to determine an elongation (%) corresponding to each tensile strength (1.0 g/d, 5.0 g/d, or 8.8 g/d), and the strength (g/d) and the maximum elongation (%) at the highest strength of the fiber.

(2) Dray Shrinkage

Testrite MK-V equipment (Testrite, United Kingdom) was used to measure the dry shrinkage under conditions of 180° C. and ultra-tension of 30 g for 2 minutes.

(3) Young's Modulus

Young's modulus and strength/elongation were measured according to the ASTM D 885 method. Table 2 presents the measurement results of Young's modulus at 1% elongation or at 2% elongation, that is, at position where the fiber has elongation of 1% or 2%.

(4) Toughness

The toughness ($J/m^3$) of the fiber was determined according to the following calculation formula 3:

$$\text{Toughness(work of rupture)} = \int_0^{strain} F \cdot dl \quad \text{[Calculation Formula 3]}$$

In the calculation formula 3, F denotes the load applied when the length of the polyester fiber or fabric is increased by dl; and dl is the increment of the length of the polyester fiber or fabric.

(5) Degree of Crystallization

The density p of the polyester fiber was measured at 25° C. according to the density gradient column method using n-heptane and carbon tetrachloride, and the degree of crystallization was determined as defined by the following calculation formula 4:

$$Xc \text{ (degree of crystallization)} = \frac{p_c(p - p_a)}{p(p_c - p_a)} \quad \text{[Calculation Formula 4]}$$

In the calculation formula 4, p is the crystal density (1.457 $g/cm^3$ for PET); and $p_a$ is the amorphous density (1.336 $g/cm^3$ for PET).

(6) Intrinsic Viscosity

The oil phase was extracted from the specimen using carbon tetrachloride, dissolved with ortho-chlorophenol (OCP) at 160±2° C., and measured in regard to sample viscosity in a viscometer tube to using an automatic viscometer (Skyvis-4000). The intrinsic viscosity (IV) of the polyester fiber was determined according to the following calculation formula 5:

$$\text{Intrinsic viscosity(IV)} = \{(0.0242 \times Rel) + 0.2634\} \times F \quad \text{[Calculation Formula 5]}$$

In the calculation formula 5, $$Rel = \frac{\text{second number of solution} \times \text{solution density} \times \text{viscosity coefficient}}{OCP \text{ viscosity}}; \text{ and}$$

$$F = \frac{IV \text{ of standard chip}}{\text{Average of three } IV \text{ values measured by standard operation of standard chip}}$$

(7) CEG Content

To determine the CEG content of the polyester fiber, according to the ASTM D 664 and D 4094 standards, 0.2 g of the sample was put in a 50 ml Erlenmeyer flask and, after addition of benzyl alcohol (20 mL), completely dissolved on a hot plate at 180° C. for 5 minutes. The dissolved sample was cooled down to 160° C., mixed with 5 to 6 drops of phenolphthalein until the temperature approached to 135° C., and titrated with 0.02N KOH to calculate the CEG content (COOH million equiv./kg sample) according to the following calculation formula 6 when the sample turned from colorless to pink:

$$CEG = (A - B) \times 20 \times 1/W \quad \text{[Calculation Formula 6]}$$

In the calculation formula 6, A is the amount (mL) of KOH used to titrate the sample; B is the amount (mL) of KOH used to titrate the blank sample; and W is the weight (g) of the sample.

(8) Filament Fineness

To determine the filament fineness, the fiber cut in a length of 9,000 m was weighed to determine the total fineness (denier) of the fiber, which was then divided by the number of filaments.

TABLE 2

| Div. | Examples | | | | |
|---|---|---|---|---|---|
| | 1 | 2 | 3 | 4 | 5 |
| Degree of crystallization (%) | 43.2 | 43.9 | 45.2 | 45.6 | 46.3 |
| Intrinsic viscosity (dl/g) of fiber | 0.93 | 0.97 | 1.05 | 1.11 | 1.17 |
| CEG content (meq/kg) of fiber | 33 | 29 | 27 | 26 | 26 |
| Maximum tensile strength (g/d) of fiber | 9.1 | 9.2 | 9.25 | 9.3 | 9.35 |
| Breaking elongation (at highest tensile strength; $S^1$, %) of fiber | 16.5 | 17 | 18.7 | 19.0 | 18.5 |
| Dry shrinkage ($S^2$, %) of fiber | 5.2 | 5.3 | 2.8 | 4.0 | 5.3 |
| $S^1 + S^2$ (%) | 21.7 | 22.3 | 21.5 | 23.0 | 23.8 |
| Young's modulus (at 1% elongation; $M^1$, g/de) of fiber | 85 | 84 | 79 | 78 | 82 |
| Young's modulus (at 2% elongation; $M^2$, g/de) of fiber | 47.0 | 46.6 | 26.8 | 26.3 | 26.0 |
| $M^1/M^2$ | 1.81 | 1.80 | 2.95 | 2.97 | 3.15 |
| Toughness ($J/m^3$) of fiber | 79 | 80 | 86 | 87 | 86 |
| Filament fineness (DPF) of fiber | 3.82 | 3.23 | 2.92 | 4.61 | 4.17 |
| Total fineness (de) of fiber | 420 | 420 | 420 | 600 | 600 |
| Filament count of fiber | 110 | 130 | 114 | 130 | 144 |
| Elongation (%) at 1.0 g/d | 0.870 | 0.878 | 0.865 | 0.892 | 0.887 |
| Elongation (%) at 5.0 g/d | 8.640 | 8.189 | 11.1 | 8.065 | 8.023 |
| Elongation (%) at 8.8 g/d | 14.6 | 13.3 | 16.8 | 14.3 | 14.6 |
| Increment of elongation (%) from 8.8 g/d to highest tensile strength | 1.9 | 3.7 | 1.9 | 4.7 | 3.9 |

Comparative Examples 1 to 5

The procedures were performed in the same manner as described in Examples 1 to 5, excepting that polyester fiber of Comparative Examples 1 to 5 were prepared under the conditions given in the following table 3.

TABLE 3

| Div. | Comparative Examples | | | | |
|---|---|---|---|---|---|
| | 1 | 2 | 3 | 4 | 5 |
| PET content (mol %) | 100 | 100 | 100 | 100 | 100 |
| Intrinsic viscosity (dl/g) of PET chip | 0.85 | 0.90 | 0.95 | 0.90 | 0.95 |
| CEG content (meq/kg) of PET chip | 50 | 47 | 43 | 47 | 43 |
| Spinning temperature (° C.) | 301 | 302 | 305 | 302 | 305 |
| Total draw ratio | 4.95 | 5.03 | 5.10 | 5.03 | 5.10 |
| Heat treatment temperature (° C.) | 220 | 223 | 227 | 223 | 227 |
| Relaxation (%) | 4.7 | 4.75 | 4.8 | 4.75 | 4.8 |

The polyester fibers prepared in Comparative Examples 1 to 5 were measured in regard to properties, and the measurements of the properties are presented in Table 4.

TABLE 4

| Div. | Comparative Examples | | | | |
|---|---|---|---|---|---|
| | 1 | 2 | 3 | 4 | 5 |
| Degree of crystallization (%) | 41.7 | 41.9 | 41.9 | 41.9 | 41.9 |
| Intrinsic viscosity (dl/g) of fiber | 0.61 | 0.63 | 0.65 | 0.63 | 0.65 |
| CEG content (meq/kg) of fiber | 57 | 53 | 50 | 53 | 50 |
| Maximum tensile strength (g/d) of fiber | 6.9 | 7.2 | 7.5 | 7.2 | 7.5 |
| Breaking elongation (at highest tensile strength; $S^1$, %) of fiber | 10 | 11 | 13 | 11 | 13 |
| Dry shrinkage ($S^2$, %) of fiber | 15.5 | 15 | 13.7 | 15 | 13.7 |
| $S^1 + S^2$ (%) | 25.5 | 26 | 26.7 | 26 | 26.7 |
| Young's modulus (at 1% elongation; $M^1$, g/de) of fiber | 115 | 119 | 125 | 119 | 125 |

TABLE 4-continued

| | Comparative Examples | | | | |
|---|---|---|---|---|---|
| Div. | 1 | 2 | 3 | 4 | 5 |
| Young's modulus (at 2% elongation; $M^2$, g/de) of fiber | 85 | 91 | 93 | 91 | 93 |
| $M^1/M^2$ | 1.35 | 1.31 | 1.34 | 1.31 | 1.34 |
| Toughness ($J/m^3$) of fiber | 59 | 63 | 67 | 63 | 67 |
| Filament fineness (DPF) of fiber | 7.35 | 6.94 | 6.94 | 10.0 | 9.14 |
| Total fineness (de) of fiber | 500 | 500 | 500 | 680 | 680 |
| Filament count of fiber | 68 | 72 | 72 | 68 | 72 |
| Elongation (%) at 1.0 g/d | 0.770 | 0.773 | 0.785 | 0.773 | 0.785 |
| Elongation (%) at 5.0 g/d | 6.370 | 6.390 | 6.420 | 6.370 | 6.390 |
| Elongation (%) at 8.8 g/d | — | — | — | — | — |
| Increment of elongation (%) from 8.8 g/d to highest tensile strength | — | — | — | — | — |

Figure 3:
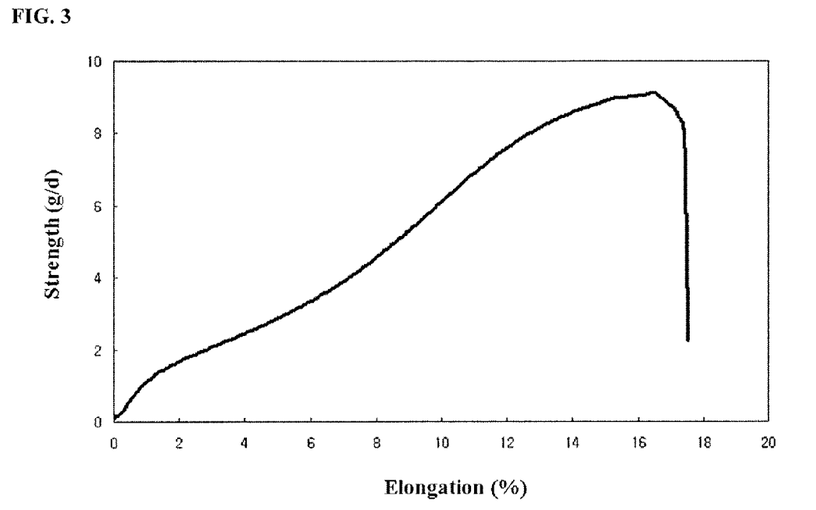
FIG. 3 is the strength-elongation curve of a polyester fiber according to Example 1 in the present invention.
Figure 4:
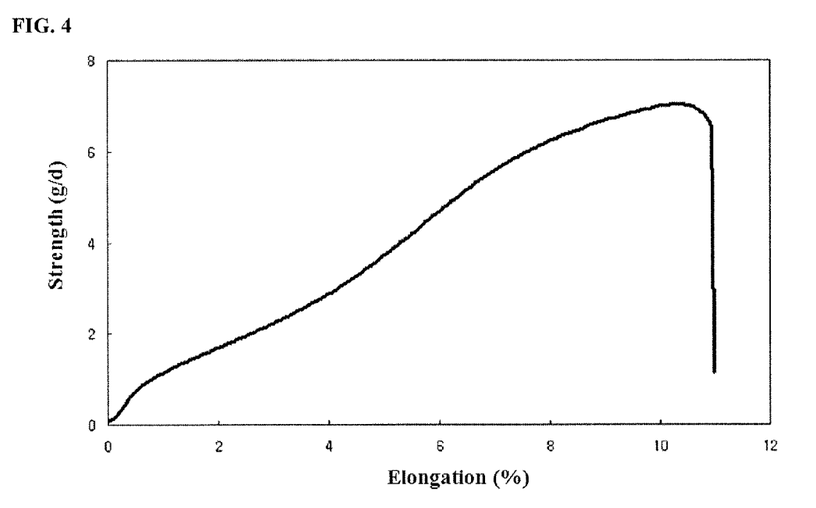
FIG. 4 is the strength-elongation curve of a polyester fiber according to Comparative Example 1 in the present invention.

The strength-elongation curves of the polyester fibers according to Example 1 and Comparative Example 1 are presented in FIGS. 3 and 4, respectively.

The fiber for airbag according to Example 1 has a high strength, that is, the highest strength of 9.1 g/d in the strength-elongation curve shown in FIG. 3, where the initial slope is considerably low, showing a low initial Young's modulus. Therefore, the polyester fiber of Example 1 has good characteristics of high strength, high elongation and low Young's modulus and thus can secure good mechanical properties and air sealing effect when applied to an airbag fabric for vehicle.

Contrarily, the fiber for airbag according to Comparative Example 1 has the highest strength of no more than 6.9 g/d at breaking in the strength-elongation curve of FIG. 4, where the initial slope is considerably high, showing a high initial Young's modulus. In other words, the fiber has low toughness and high Young's modulus. With such a low toughness and high initial Young's modulus, the polyester fiber of Comparative Example 1, when used in an airbag fabric, exhibits a poor ability to absorb high temperature high pressure gas energy from the inflator and deteriorates the packaging performance of the airbag cushion, so it is not suitable for use in an airbag fabric.

Preparation Examples 1 to 5

Each of the polyester fibers prepared in Examples 1 to 5 was woven into a grey fabric for airbag through a rapier loom and subjected to scouring and tentering to prepare an airbag fabric. The airbag fabric thus obtained was coated with liquid silicone rubber (LSR) resin by knife over-roll coating to prepare a silicon-coated fabric.

The warp and weft weave density, weaving type, and resin coating weight for the fabrics are presented in Table 5. The other conditions are as known in the prior art in association with the preparation of a polyester fabric for airbag.

TABLE 5

| | Preparation Examples | | | | |
|---|---|---|---|---|---|
| Div. | 1 | 2 | 3 | 4 | 5 |
| Weave density (warp × weft) | 49 × 49 | 49 × 49 | 49 × 49 | 43 × 43 | 43 × 43 |
| Weaving type | Plain weaving | Plain weaving | Plain weaving | Plain weaving | Plain weaving |
| Heat treatment/ vulcanization temperature (° C.) | 180 | 185 | 190 | 185 | 190 |

TABLE 5-continued

| | Preparation Examples | | | | |
|---|---|---|---|---|---|
| Div. | 1 | 2 | 3 | 4 | 5 |
| Rubber component | LSR | LSR | LSR | LSR | LSR |
| Resin coating weight (g/m$^2$) | 23 | 25 | 27 | 25 | 27 |

The polyester fabrics prepared using the polyester fibers of Examples 1 to 5 were measured in regard to properties according to the following methods. The measurement results are presented in Table 6.

(a) Toughness

The toughness ($J/m^3$) of the fabric was determined according to the following calculation formula 3:

$$\text{Toughness(work of rupture)} = \int_0^{strain} F \cdot dl \quad \text{[Calculation Formula 3]}$$

In the calculation formula 3, F denotes the load applied when the length of the polyester fiber or fabric is increased by dl; and dl is the increment of the length of the polyester fiber or fabric.

The toughness of the fabric was measured for the uncoated fabric before the coating process.

(b) Tear Strength

Test specimens in dimension of 75 mm×200 mm were cut out of the uncoated fabric before the coating process and the coated fabric after the coating process. The upper and lower ends of each specimen were gripped between left and right spaces of the upper and lower jaw faces, respectively, in a testing machine according to the ASTM D 2261 TONGUE procedure. Based on the distance between the jaw faces, the jaw faces moved apart at a tearing rate of 300 mm/min with the gap between the jaw faces increasing at 76 mm/min to measure the tear strength of the airbag fabric.

(c) Tensile Strength and Breaking Elongation

The uncoated fabric before the coating process was cut into a test specimen, which was gripped in the lower stationary clamp of a tensile testing machine according to the ASTM D 5034 method, while the upper clamp was moved upward, to measure the tensile strength $T_1$ and the breaking elongation when the airbag fabric specimen was ruptured.

(d) Warp and Weft Shrinkages

The fabric was measured in regard to warp and weft shrinkages according to the ASTM D 1776 method. In the procedure, the uncoated fabric before the coating process was cut into a test specimen. Lines marking a 20 cm of length in the warp and weft directions were made in the specimen fabric before shrinkage. After one-hour heat treatment in a chamber at 149° C., the lengths of the mark lines of the shrunk specimen fabric were measured to determine the warp and weft shrinkages as follows:

$$\frac{(\text{length before shrinkage}) - (\text{length after shrinkage})}{(\text{length before shrinkage})} \times 100\%$$

(e) Stiffness

The uncoated fabric before the coating process was evaluated in regard to stiffness according to the ASTM D 4032 procedure (circular bend test method) using a stiffness testing machine. The stiffness testing adopted the cantilever method, where the stiffing testing machine used a test stand declined at a predetermined angle for bending the fabric to measure the length of the fabric after bending.

(f) Thickness

The uncoated fabric before the coating process was measured in regard to thickness according to the ASTM D 1777 method.

(g) Air Permeability

According to the ASTM D 737 method, the uncoated fabric before the coating process was kept under conditions of 20° C. and 65% RH for one hour or longer. The static air permeability was determined as the volume of air passing through the circular cross-section 38 cm² in size, where the air pressure ΔP was 125 pa or 500 pa.

Further, the dynamic air permeability of the uncoated fabric was measured using a dynamic air permeability tester (TEXTEST FX 3350) according to the ASTM D 6476.

TABLE 6

| Div. | | Preparation Examples | | | | |
|---|---|---|---|---|---|---|
| | | 1 | 2 | 3 | 4 | 5 |
| Toughness (kJ/m³) of fabric | | 3.75 | 3.83 | 3.92 | 5.4 | 5.6 |
| Tear strength (kgf)/ uncoated fabric | | 19 | 19 | 20 | 26 | 26 |
| Tear strength (kgf)/ coated fabric | | 36 | 37 | 38 | 38 | 40 |
| Tensile strength (kgf/inch) of fabric | | 227 | 230 | 234 | 297 | 305 |
| Breaking elongation (%) of fabric | | 37 | 37 | 39 | 38 | 40 |
| Shrinkage (%) | Warp | 0.5 | 0.5 | 0.4 | 0.4 | 0.5 |
| | Weft | 0.3 | 0.3 | 0.4 | 0.3 | 0.3 |
| Stiffness (kgf) | | 0.40 | 0.40 | 0.35 | 1.00 | 0.90 |
| Thickness (mm) | | 294 | 294 | 295 | 338 | 338 |
| Static air perme- ability (cfm) | ΔP = 125 pa | 1.0 | 0.9 | 0.8 | 0.6 | 0.6 |
| | ΔP = 500 pa | 9.5 | 9.3 | 9.2 | 5.4 | 5.4 |
| Dynamic air permeability (mm/s) | | 620 | 610 | 590 | 450 | 430 |

Comparative Preparation Examples 1 to 5

The procedures were performed in the same manner as described in Preparation Examples 1 to 5, excepting that polyester fibers of Comparative Examples 1 to 5 were used to prepare polyester fabrics of Comparative Preparation Examples 1 to 5. The measurement results of the properties are presented in Table 7.

TABLE 7

| Div. | | Comparative Preparation Examples | | | | |
|---|---|---|---|---|---|---|
| | | 1 | 2 | 3 | 4 | 5 |
| Toughness (kJ/m³) of fabric | | 2.5 | 2.7 | 2.9 | 2.7 | 2.9 |
| Tear strength (kgf)/ uncoated fabric | | 13 | 14 | 15 | 19 | 20 |
| Tear strength (kgf)/ coated fabric | | 21 | 23 | 23 | 23 | 24 |
| Tensile strength (kgf/inch) of fabric | | 187 | 195 | 200 | 195 | 200 |
| Breaking elongation (%) of fabric | | 20 | 21 | 22 | 20 | 22 |
| Shrinkage (%) | Warp | 1.3 | 1.3 | 1.2 | 1.2 | 1.1 |
| | Weft | 1.2 | 1.0 | 0.9 | 1.0 | 0.9 |
| Stiffness (kgf) | | 2.1 | 1.9 | 1.8 | 2.3 | 2.3 |
| Thickness (mm) | | 303 | 305 | 305 | 350 | 350 |
| Static air perme- ability (cfm) | ΔP = 125 pa | 2.4 | 2.3 | 2.2 | 2.2 | 2.1 |
| | ΔP = 500 pa | 13.5 | 13.3 | 13.0 | 12.6 | 12.5 |
| Dynamic air permeability (mm/s) | | 1,900 | 1,850 | 1,800 | 1,950 | 1,850 |

As shown in Table 6, the airbag fabrics of Preparation Examples 1 to 5 using the polyester fibers of Examples 1 to 5, which acquired low initial Young's modulus and an optimized range of tensile strength and elongation, showed good characteristics, such as tensile strength of 227 to 305 kgf/inch, tear strength for uncoated fabric in the range of 19 to 26 kgf, warp shrinkage of 0.4 to 0.5%, and weft shrinkage of 0.3 to 0.4%. Furthermore, the polyester fabrics of Preparation Examples 1 to 5 had an optimum range of stiffness ranging from 0.35 kgf to 1.0 kgf, thereby remarkably enhancing folding and packing properties as well as dimensional stability and mechanical properties.

By using a polyester fiber with low initial Young's modulus, high strength, and high elongation, the airbag fabrics of Preparation Examples 1 to 5 showed good packaging performance, such as a static air permeability for an uncoated fabric in the range of 0.6 to 1.0 cfm at ΔP=125 pa and 5.4 to 9.5 cfm at ΔP=500 pa.

Contrarily, as shown in Table 7, the airbag fabrics of Comparative Preparation Examples 1 to 5 using the polyester fibers of Comparative Examples 1 to 5 had unsatisfactory characteristics. More specifically, the airbag fabrics of Comparative Preparation Examples 1 to 5 were drastically poor in the properties, such as warp/weft shrinkage of 0.9 to 1.3%, tensile strength of 187 to 200 kgf/inch, and tear strength for an uncoated fabric in the range of 13 to 20 kgf. The use of the fabrics extremely poor in mechanical properties, such as tensile strength and tear strength, in an airbag device may cause problems in association with deterioration of mechanical properties, such as rupture of the airbag during unfolding.

Moreover, the uncoated fabrics of Comparative Preparation Examples 1 to 5 had an extremely increased static air permeability, such as 2.1 to 2.4 cfm ΔP=125 pa and 12.5 to 13.5 cfm at ΔP=500 pa, demonstrating deterioration of packaging performance. Such an increase in the air permeability leads to air leakage that makes the airbag useless.

What is claimed:

1. A polyester fiber having an elongation of 0.8 to 2.0% under a tensile strength of 1.0 g/d at the room temperature, and an additional elongation of 1.5 to 5% under a tensile strength of 8.8 g/d to the maximum,
    wherein the polyester fiber has a breaking elongation of 14%-23%, a dry shrinkage of 1.2%-6.5%, a total fineness of 460 to 650 denier, and a filament fineness of 3.23 to 6.8 denier per filament, and comprises 96-160 filaments;

wherein the polyester fiber has a Young's modulus of 60 to 100 g/de at 1% elongation and 20 to 60 g/de at 2% elongation, wherein the Young's modulus is measured according to the ASTM D 885 method.

2. The polyester fiber as claimed in claim 1, wherein the polyester fiber has an elongation of 6.5 to 13.5% under a tensile strength of 5.0 g/d at the room temperature.

3. The polyester fiber as claimed in claim 1, wherein the polyester fiber has a breaking elongation of 16.5%-22% and a dry shrinkage of 1.5%-5.7%.

4. The polyester fiber as claimed in claim 1, wherein the sum of breaking elongation (S1) and dry shrinkage (S2) is defined by the following calculation formula 1:

$$18 \leq S^1 + S^2 \leq 25 \quad \text{[Calculation Formula 1]}$$

wherein S1 is the breaking elongation (%) of the polyester fiber; and S2 is the dry shrinkage (%) of the polyester fiber.

5. The polyester fiber as claimed in claim 1, wherein the ratio (M1/M2) of the Young's modulus M1 at 1% elongation to the Young's modulus M2 at 2% elongation is defined by the following calculation formula 2:

$$1.7 \leq M^1/M^2 \leq 3.5 \quad \text{[Calculation Formula 2]}$$

wherein M1 is the Young's modulus (g/de) of the polyester fiber at 1% elongation as measured at the room temperature according to the ASTM D 885 method; and M2 is the Young's modulus (g/de) of the polyester fiber at 2% elongation as measured at the room temperature according to the ASTM D 885 method.

6. The polyester fiber as claimed in claim 1, wherein the polyester fiber has a filament fineness of 3.23 to 4.55 DPF.

7. The polyester fiber as claimed in claim 1, wherein the polyester fiber is prepared from polyester chips having an intrinsic viscosity of 1.05 to 2.0 dl/g.

8. A polyester fiber having an elongation of 0.8 to 2.0% under a tensile strength of 1.0 g/d at the room temperature, and an additional elongation of 1.5 to 5% under a tensile strength of 8.8 g/d to the maximum, wherein the polyester fiber has a breaking elongation of 14%-23%, a dry shrinkage of 1.2%-6.5%, a total fineness of 460 to 650 denier, and a filament fineness of 3.23 to 6.8 denier per filament, and comprises 96-160 filaments;

wherein the polyester fiber has a Young's modulus of 60 to 100 g/de at 1% elongation and 20 to 60 g/de at 2% elongation, wherein the Young's modulus is measured according to the ASTM D 885 method, wherein the polyester fiber is prepared by melt-spinning a polyester polymer having an intrinsic viscosity of 1.05 to 2.0 dl/g at 270 to 305° C. to prepare an undrawn polyester fiber;

drawing the undrawn polyester fiber at a total draw ratio of 5.0 to 6.5; and thermo-setting the drawn polyester fiber at 170 to 250° C.

9. The polyester fiber of claim 8, wherein the drawing of the undrawn polyester fiber is carried out at a total draw ratio of 5.0 to 6.11.

* * * * *